Aug. 17, 1965     E. L. HARRIS     3,201,084

TIRE REPAIR FIXTURE

Original Filed May 23, 1960     2 Sheets-Sheet 1

INVENTOR.
EARL L. HARRIS
BY
*Lockwood, Woodard, Smith & Weikart*
Attorneys

Aug. 17, 1965   E. L. HARRIS   3,201,084
TIRE REPAIR FIXTURE
Original Filed May 23, 1960   2 Sheets-Sheet 2

INVENTOR.
EARL L. HARRIS
BY
Lockwood, Woodard, Smith & Weikart
Attorneys

United States Patent Office 3,201,084
Patented Aug. 17, 1965

3,201,084
TIRE REPAIR FIXTURE
Earl L. Harris, R.R. 1, Spencer, Ind.
Original application May 23, 1960, Ser. No. 32,505, now Patent No. 3,088,348, dated May 7, 1963. Divided and this application May 3, 1963, Ser. No. 277,793
2 Claims. (Cl. 254—50.4)

This invention relates generally to a releasable fixture or holder and in particular to a fixture adapted to properly position and secure for repair either a tubeless tire or a conventional tire inner tube.

The present application is a division of my copending continuation-in-part application for Tire and Tube Repair Fixture filed May 23, 1960, S.N. 32,505, and which application became Patent No. 3,088,348.

With the increasing use of the tubeless tires on modern automobiles, a need has arisen for a procedure and apparatus for repairing small cuts or punctures in such tires. One conventional procedure for repairing punctures in tubeless tires involves coring out the tire at the puncture and inserting a plug in the opening thereby formed. This often results in severing of the tire cords adjacent the puncture opening and in consequent weakening of the tire structure. Sealing small puncture openings by abraiding the adjacent inner surface of the tire and applying a sealing patch is made difficult, in the case of tubeless tires, because of the inaccessibility of the inner surface of the tire.

In repairing the inner tubes of conventional tube-type tires, it is important that a fixture or holder be provided for positively clamping the tube in conveniently accessible position so that the surface adjacent any puncture or cut may be abraided or otherwise prepared for receiving a sealing patch. Devices serving this function are not unknown in the prior art, however, they leave much to be desired in the positiveness of their clamping action and in their ease of operation.

It is the primary object of the present invention, therefore, to provide a fixture or holder which may be alternately operated to positively clamp either a tubeless tire or a conventional tire inner tube in proper position for repair.

A further object of the present invention is to provide a fixture for repair positioning of a tubeless tire which utilizes a linkage having an over-center action to positively clamp and spread the tire so that its inner surface is accessible.

A further object of the present invention is to provide a fixture or holder for clamping either a tubeless tire or a conventional tire inner tube in repair position, the fixture structure being characterized by ease in mounting and use.

The full nature of the invention will be understood from the accompanying drawings and the following description and claims:

Figure 1:
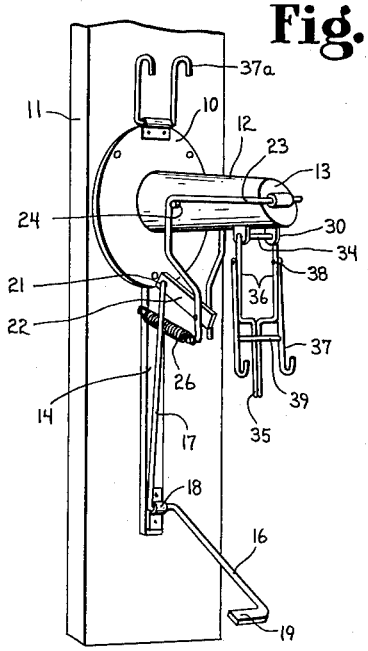
FIG. 1 is a perspective view of a fixture embodying the present invention.
Figure 2:
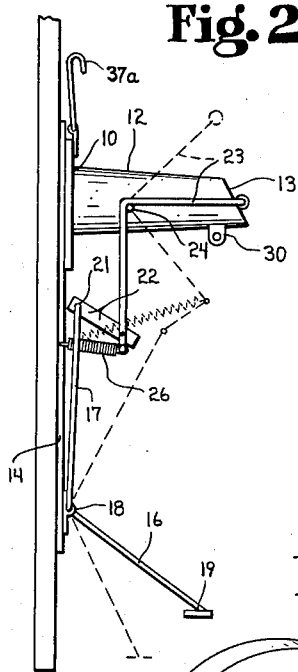
FIG. 2 is a schematic, side view of the inner tube clamping mechanism of the fixture.
Figure 3:
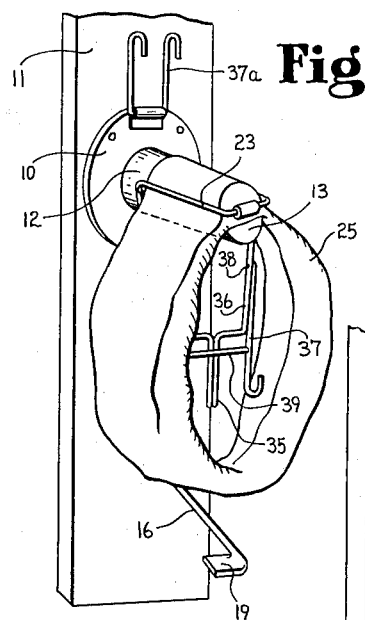
FIG. 3 is a perspective view of the fixture with an inner tube clamped in place thereon.

Referring initially to FIGS. 1, 2, and 3, the fixture includes a flanged base plate 10 having a frusto-conical configuration and adapted to be mounted upon a vertical surface such as that provided by a support post, wall or like, indicated at 11. A generally cylindrical anvil 12 extends horizontally from the base plate and has its outer end formed so as to incline downwardly and outwardly with relation to the base plate as indicated at 13. A depending bar 14 is rigidly secured, by welding or other suitable means, to the lower margin of the base plate. A generally V-shaped member having a lower leg 16 and an upper leg 17 is pivotally supported at 18 on the bar 14. The free end of the leg 16 is formed to provide a suitable foot pedal 19.

The upper end of the leg 17 is pivotally attached at 21 to a link 22. The outer end of the link 22 pivotally supports the adjacent free ends of the generally U-shaped clamping member 23. The clamping member is also pivotally supported at 24 on the anvil. A tension spring 26 extends between the bar 14 and the pivotal supporting junction between the clamping member and the link 22.

The tube clamping portion of the fixture will now be described with reference to FIGS. 2 and 3. As may be seen in FIG. 2, the spring 26 retains the foot pedal and clamping member in their solid line positions, the transverse portion of the clamping member being held tightly against the inclined outer end of the anvil. By depressing the foot pedal, the legs 16 and 17 will be moved to their broken line positions of FIG. 2 against the force exerted by the tension spring. By means of the displacement of the link 22, the clamping member 23 will be pivoted about its support 24 into its broken line position. With the foot pedal held in its depresssed position an inner tube, indicated at 25 in FIG. 3, may be positioned over the anvil as shown in FIG. 3, with the inner tube area requiring processing being positioned over the upper convex surface of the anvil. Subsequent release of the foot pedal thereupon permits the linkage to its solid line position of FIG. 2, the tension spring thereby presssing the clamping member over the inner tube and positively holding it on the anvil. The tube may then be processed and repaired with release of the tube from the anvil being accomplished by again depressing the foot pedal 19.

Figure 5:
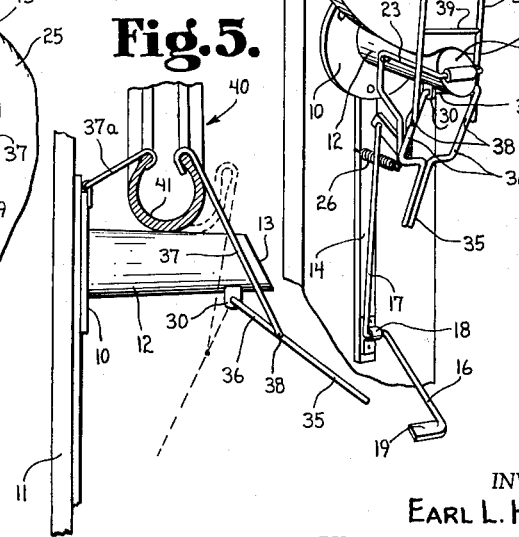
FIG. 5 is a schematic, side view of the fixture illustrating the operation of the tubeless tire supporting portion of the fixture.
Figure 4:
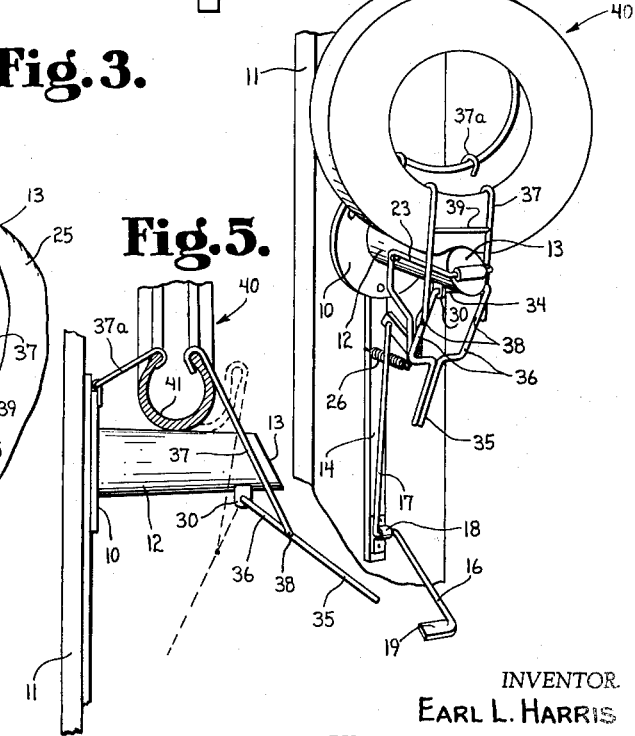
FIG. 4 is a perspective view of the fixture with a tubeless tire supported thereon.

The tubeless tire supporting portion of the fixture will now be described with reference to FIGS. 1, 4, and 5. Spaced, depending ears 30 rigidly secured to the underside of the anvil pivotally support the transverse portion 34 of a handle member 35 having spaced legs 36. A pair of tire bead-engaging hooks 37 are pivotally supported at 38 on the legs 36, the pivotal supports for the hooks being located intermediate the ends of the legs 36. A cross brace 39 extends between the hooks so that they may be pivotally moved in unison. A second pair of tire bead-engaging hooks 37a are pivotally supported at the upper margin of the base plate 10.

In operation, a tubeless tire indicated at 40 may be supported transversely on the upper surface of the anvil. The tire is placed on the anvil with its puncture area, or the area otherwise requiring repair, overlying the anvil. The hooks 37a may then be moved manually so as to engage the adjacent bead area of the tire. By moving the handle member 35 upwardly from its position of FIG. 1, the hooks 37 may be moved into engagement with the bead area of the tire remote from the base plate. Engagement of the handle member with the cross brace 39 co-ordinates the movement of the hooks 37 with the movement of the handle member. With the hooks 37 engaged with the bead area of the tire, the handle member 35 will rest in its solid line position of FIG. 5. Subsequent clockwise movement (as viewed in FIG. 5) of the handle member will displace the pivotal mounting 38 of the hooks 37 from a position outboard of the pivotal support of the handle member to a position inboard thereof, these positions being illustrated in solid and broken lines respectively in FIG. 5.

Figure 6:
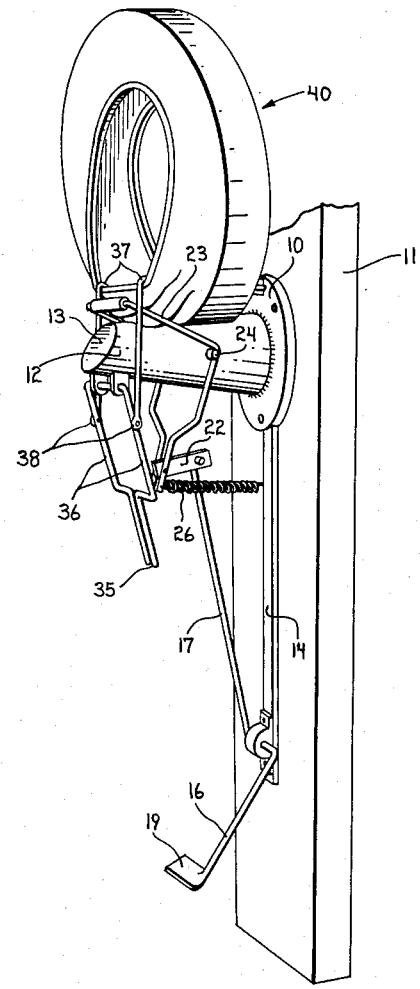
FIG. 6 is a perspective view of the fixture illustrating further operation of the tubeless tire supporting fixture.

In moving the hooks 37 over center, the bead areas of the tire will be separated with the resilience of the tire structure serving to hold the handle member in its broken line position. With the bead areas of the tire spread apart, the inner surface of the tire, indicated at 41, will be exposed for repair processing. The tube clamping structure also aids in the tubeless tire repairing function in that, with the tire bead areas separated as in FIG. 4, depressing foot pedal 19 raises the member 23 to its broken line position of FIG. 2 whereby the member 23 engages the outer face of the tire and distorts it upwardly. This action of member 23 serves to flatten and raise the sidewall area of the tire, thus making the inner surface more accessible for inspection and repair. FIG. 6 shows the device in this position.

From the foregoing, it will be evident that the fixture of the present invention includes components which may be utilized to support either a tubeless tire or a conventional inner tube in position for repair or other processing. The structures utilized in performing both of these functions is characterized by positive action and ease of operation.

Although various modifications may occur to others skilled in the art, the scope of the present invention is to be limited only by the appending claims.

The invention claimed is:

1. A fixture for supporting a tubeless tire in repair position, said fixture comprising a support member including a flanged base plate adapted to be mounted on a vertical wall surface or the like, an anvil extending horizontally from said base and adapted to receive the tread area of a tubeless tire transversely across its upper surface, means providing a first pair of tire bead-engaging hooks pivotally mounted on said base plate and overlying said anvil, a member providing an actuating handle pivotally supported on the underside of said anvil on a transverse axis spaced outwardly from said tread-engaging area, and a second pair of tire bead-engaging hooks pivotally carried by said handle member intermediate its ends, whereby with said first pair of hooks engaging the tire bead adjacent said base plate and with said second pair of hooks engaging the tire bead remote from said base plate, said handle member may be pivotally moved to displace the pivotal junction of said second pair of hooks with said handle member from a position of outboard of the pivotal support of said handle member to a position inboard thereof to thereby hold the tire on the anvil with its bead areas spread to expose the inner surface of the tire, and a generally U-shaped clamping member overlying said anvil and pivotally supported on the sides of said anvil at points intermediate the ends of its legs, the free ends of the legs of the clamping member being formed to depend below said anvil, and foot operated means connected to the free ends of said clamping member legs, said foot operated means when actuated serving to pivotally move said U-shaped clamping member to displace its bight portion upwardly against the tire, whereby the tire sidewall area is distorted to render its inner surface more accessible for inspection or repair.

2. A fixture for supporting a tubeless tire in repair position, said fixture comprising a support member including a base plate adapted to be mounted on a vertical surface, an anvil extending horizontally from said base and adapted to receive the tread area of a tubeless tire transversely across its upper surface, means providing a first tire bead-engaging hook pivotally mounted above said anvil, a member providing an actuating handle pivotally supported on the underside of said anvil on a transverse axis spaced outwardly from said tread-engaging area, and a second tire bead-engaging hook pivotally carried by said handle member intermediate its ends, whereby with said first hook engaging the tire bead adjacent said base plate and with said second hook engaging the tire bead remote from said base plate, said handle member may be pivotally moved to displace the pivotal junction of said second hook with said handle member from a position outboard of the pivotal support of said handle member to a position inboard thereof to thereby hold the tire on the anvil with its bead areas spread to expose the inner surface of the tire, and a generally U-shaped clamping member overlying said anvil and pivotally supported on the sides of said anvil at points intermediate the ends of its legs, the free ends of the legs of the clamping member being formed to depend below said anvil, and foot operated means connected to the free ends of said clamping member legs, said foot operated means when actuated serving to pivotally move said U-shaped clamping member to displace its bight portion upwardly against the tire, whereby the tire sidewall area is distorted to render its inner surface more accessible for inspection or repair.

References Cited by the Examiner

UNITED STATES PATENTS 1,595,883  8/26  Simpson _____ 81—15.3 X
2,525,114  10/50 Branick _____ 81—15.3 X WILLIAM FELDMAN, *Primary Examiner.*

JAMES L. JONES, JR., *Examiner.*